United States Patent
Ahlstrand et al.

(10) Patent No.: US 8,492,455 B2
(45) Date of Patent: Jul. 23, 2013

(54) ACTIVATED CARBON AS A MEANS TO REDUCE TASTE AND ODOR FROM PLASTIC MATERIALS

(75) Inventors: Lars-Erik Ahlstrand, Ucklum (SE);
Perry Nylander, Goeteborg (SE);
Per-Ola Hagstrand, Stenungsund (SE)

(73) Assignee: Borealis Technology Oy, Porvoo (FI)

( * ) Notice: Subject to any disclaimer, the term of this patent is extended or adjusted under 35 U.S.C. 154(b) by 616 days.

(21) Appl. No.: 12/521,508

(22) PCT Filed: Nov. 22, 2007

(86) PCT No.: PCT/EP2007/010148
§ 371 (c)(1),
(2), (4) Date: Sep. 13, 2010

(87) PCT Pub. No.: WO2008/080458
PCT Pub. Date: Jul. 10, 2008

(65) Prior Publication Data
US 2011/0003933 A1 Jan. 6, 2011

(30) Foreign Application Priority Data
Dec. 28, 2006 (EP) .................................... 06027025

(51) Int. Cl.
*A61L 9/014* (2006.01)
*C08L 23/06* (2006.01)
*C08L 23/04* (2006.01)
*C08K 3/04* (2006.01)

(52) U.S. Cl.
USPC ........... 523/102; 524/495; 524/543; 524/570; 524/585; 524/847; 525/240

(58) Field of Classification Search
USPC ................. 523/102; 524/495, 543, 570, 585, 524/847; 525/240
See application file for complete search history.

(56) References Cited

U.S. PATENT DOCUMENTS

| 2,611,789 A | 9/1952 | Good et al. | |
| 3,436,343 A | 4/1969 | Smith | |
| 4,221,695 A | 9/1980 | Hino et al. | |
| 4,551,267 A | 11/1985 | Fushimi et al. | |
| 4,833,181 A * | 5/1989 | Narukawa et al. | 524/13 |
| 5,436,282 A * | 7/1995 | Gustafsson et al. | 523/102 |
| 5,897,779 A * | 4/1999 | Wisted et al. | 210/651 |
| 6,297,408 B1 * | 10/2001 | Haas et al. | 568/862 |
| 2002/0032266 A1 | 3/2002 | Sextl et al. | |
| 2003/0092560 A1 * | 5/2003 | Von Blucher et al. | 502/10 |
| 2003/0118823 A1 * | 6/2003 | Hiltzik et al. | 428/403 |
| 2005/0228139 A1 * | 10/2005 | Lee et al. | 525/191 |
| 2008/0207442 A1 * | 8/2008 | Pfeifer et al. | 502/416 |
| 2009/0252910 A1 * | 10/2009 | Baeckman et al. | 428/36.92 |
| 2009/0253863 A1 * | 10/2009 | Nord-Varhaug et al. | 525/52 |

FOREIGN PATENT DOCUMENTS

| CN | 1104174 A | 6/1995 |
| CN | 1815007 A | 8/2006 |
| EP | 1693398 | 8/2006 |
| JP | 60001252 | 1/1985 |
| JP | 1023970 | 1/1989 |
| JP | 10000145 | 1/1998 |
| WO | 92/13029 | 8/1992 |
| WO | WO 2006048253 A1 * | 5/2006 |
| WO | WO 2006048257 A1 * | 5/2006 |

OTHER PUBLICATIONS

Norit Activated Carbon Data Sheet DARCO G-60; Norit Americas, Inc. Aug. 2010.*
Martin-Gullon, I.; Marco-Lozar, J. P.; Cazorla-Amorós, D.; Linares-Solano, A. Carbon, 2004, 42, 1339-1343; Elsevier Ltd.*
Kiyoshi Kobayashi, Studies on the Active Carbon, Section IV. The Electrical Resistance of the Active Carbon (2), Wood Chemistry, Section 1, Nov. 30, 1956, pp. 25-30.

* cited by examiner

*Primary Examiner* — Michael Pepitone
(74) *Attorney, Agent, or Firm* — Roberts Mlotkowski Safran & Cole, P.C.

(57) ABSTRACT

The present invention relates to a polyolefin composition comprising: a) an olefin homo- or copolymer (A), and b) activated carbon (B) as a taste and/or odor reducing agent, to the use of such a polyolefin composition, and to a pipe material and pipe having reduced taste and/or odor development comprising the above polyolefin composition.

9 Claims, No Drawings

ACTIVATED CARBON AS A MEANS TO REDUCE TASTE AND ODOR FROM PLASTIC MATERIALS

The present invention relates to a polyolefin composition which has reduced taste and odour development which polyolefin composition is specifically suitable for pipe materials. The present invention further relates to a process for preparing the polyolefin composition and such a pipe material.

Taste and/or odour developments in plastic materials is known due to taste and/or odour developing substances caused by chemical degradation or transformation in connection with the production of compounding of the plastic materials. Such substances can be of a highly varying chemical character. The occurrence can constitute a health hazard or a source of irritation. Even comparatively low concentrations of such odour- and/or taste-producing substances constitute a disadvantage in plastic materials as the human being is highly susceptible to odours and tastes in general. Concentrations as low as one or a few ppb are sufficient to make a taste or odour evident. Therefore, attempts have been made to overcome or at least reduce such odours and tastes in various ways such as by degassing the plastic material. The effects of these attempts are reduced and the methods are lengthy and expensive.

It is further known to remove undesired odour and/or taste by means of adsorbing substances, e.g. silica gel, activated aluminum oxide, diatomaceous earth and zeolites.

To this extent JP 1,023,970 suggests adding of e.g. aluminum hydroxide, clay, diatomaceous earth, kaolin, talc, bentonite, activated carbon or activated carbon fibre for materials for packing foodstuffs to be heated in the packing. However, such additives have been found to be without any appreciable effect, except under special circumstances.

Bledzki et al. report in Polymer Testing, Vol. 18, No. 1, 6371, 1999 on reduction of odour emissions in plastic materials by the use of activated charcoal which was extruded into the plastics. The results were evaluated by dynamic olfactometry and odour concentration could be reduced up to about 50%.

EP Patent No. 0522129 discloses a process for eliminating odour/taste-producing substances in plastic water pipes by adding a specific type of zeolitic molecular sieve to a polyolefin material during processing thereof in a molten state and subsequently forming the polymer material to a water pipe. This process still suffers from a comparatively complex processing and needs a sophisticated additive, namely a hydrophobic aluminum silicate molecular sieve having a pore diameter of at least 5.5 Å, an Si/Al molar ratio in the crystal letters of at least 35, and a sorption capacity for water at 25° C. and 613 Pa of less than 10 wt.-%.

U.S. Pat. No. 4,833,181 proposes a polyolefin composition comprising a polyolefin, vegetable fibers mainly composed of cellulose fibers and a deodorizer selected from the group consisting of a combination of a metallic soap and an amine antioxidant, activated carbon, zeolite and a phosphorus compound. Moreover, it is disclosed that the effects of the emission of the deodorizer are enhanced if an antioxidant is further added. In concrete examples a phenolic antioxidant is used in admixture with activated carbon. Also this technology needs complex processing and sophisticated combination of materials which makes the preparation of the final product cost intensive.

Thus, it is the object of the present invention to provide a plastic material which has improved taste and/or odour reduction while simultaneously maintaining desirable and superior mechanical properties which material can be produced by a simple procedure and at low cost.

Moreover, it is the object of the present invention to provide an improved material suitable for pipe materials where in the use of such pipe materials extremely low concentrations of odour- and/or taste-developing substances are released into substances to be transported through the pipes, especially water.

The present invention is based on the finding that a polyolefin composition comprising activated carbon, preferably having it as the only taste and/or odour reducing agent or, alternatively, a polyolefin composition comprising an activated carbon with reduced ash content, is able to provide considerable taste and/or odour reduction while offering a product at low costs, thus reducing the additional costs.

Thus, the present invention relates to a polyolefin composition comprising:
  (i) an olefin homo- or copolymer (A), and
  (ii) a taste and odour reducing agent which consists of activated carbon (B).

In this embodiment of the composition of the invention, the only taste and odour reducing agent present in the composition is activated carbon (B).

The present invention also relates to a polyolefin composition comprising:
  (i) an olefin homo- or copolymer (A), and
  (ii) a taste and odour reducing agent which comprises activated carbon (B) having an ash content of not more than 12.0 wt.-% according to ASTM D2866.

In this embodiment of the composition of the invention, apart from activated carbon (B) having an ash content of not more than 12.0 wt.-% according to ASTM D2866, other compounds may be present as a taste and odour reducing agent in the composition.

However, it is preferred that the taste and odour reducing agent consists of activated carbon (B) having an ash content of not more than 12.0 wt.-% according to ASTM D2866.

In the following, preferred embodiments of both embodiments of the composition according to the invention are given.

The taste and odour reducing agent preferably is contained in the polyolefin composition in an amount of from 0.05 to 4%, more preferably from 0.05 to 2% and most preferably from 0.1 to 0.5%, based on the weight of the total composition.

It is preferred to add as the taste and odour reducing agent a component selected from the group consisting of crushed activated carbon, granulated activated carbon, fibrous activated carbon and powdered activated carbon. However, granulated and/or powdered activated carbons are especially preferred. Especially preferred are activated carbons based on coconut, coal or bitumen.

As such activated carbon any type may be used. In general, such an activated carbon which is suitable for the purposes of the present invention has a BET specific surface area of from 500 to 1500 $m^2/g$, preferably from 950 to 1500 $m^2/g$. A specifically preferred embodiment of the present invention uses activated carbon with an ash content of 12% by weight or less, preferably 8% by weight or less, most preferred 5% by weight or less. The bulk density preferably is in the range of from 350 to 750 $kg/m^3$, more preferably from 350 to 600 $kg/m^3$, most preferably from 350 to 500 $kg/m^3$.

In preferred embodiments activated carbons with an iodine value of 500 mg iodine/g or more are used, more preferably 750 mg/g or more and most preferred 900 to 1400 mg/g. Activated carbons preferably have a graphite content of 97 wt % or more, more preferred 98 wt % or more, most preferred 99 wt % or more. Low acidity activated carbons with 1% by weight sulphuric acid content or less are preferred, especially with 0.7% sulphuric acid content or less.

Polyolefins which may be used in the composition of the invention include homopolymers of alpha-olefins, copolymers of at least one alpha-olefin with a further co-monomer which may be one or more alpha-olefins or another co-monomer, random or block copolymers. The polyolefin (A) may also consist of a mixture of different polyolefins.

Preferably, the polyolefin (A) is a homo- or copolymer of ethylene or propylene.

According to a preferred embodiment, the polyolefin (A) used in the polyolefin composition according to the present invention is a multimodal olefin polymer, i.e. comprises at least two fractions with different weight average molecular weight.

Usually, a polyethylene composition comprising at least two polyethylene fractions, which have been produced under different polymerisation conditions resulting in different (weight average) molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

Usually, the olefin homo- or copolymer (A) makes up at least 90 wt % of the total composition. Preferably, the olefin homo- or copolymer (A) is consisting of fractions (I) and (II), optionally further comprising a prepolymer fraction in an amount of up to 20 wt %, preferably up to 10 wt %, more preferably up to 5 wt % of the total base resin.

In addition to the olefin homo- or copolymer (A) and the activated carbon (B), usual additives for utilization with polyolefins, such as pigments, stabilizers (antioxidant agents), antacids and/or anti-UVs, antistatic agents and utilization agents (such as processing aid agents) may be present in the polyethylene composition.

Preferably, the amount of these additives is 10 wt % or below, further preferred 8 wt % or below, of the total composition.

Furthermore, preferably the olefin homo- or copolymer is an ethylene copolymer which comprises (I) an ethylene homo- or copolymer fraction, and (II) an ethylene copolymer fraction comprising at least one alpha-olefin comonomer having at least 3 carbon atoms, wherein (i) fraction (I) has a lower average molecular weight than fraction (II) and (ii) the ethylene copolymer fraction (II) comprises more than 0.5 mol % of at least one alpha-olefin comonomer having at least 3 carbon atoms.

The term molecular weight where used herein denotes the weight average molecular weight $M_w$.

Furthermore, the ethylene copolymer preferably has an MFR of 0.1 to 15 g/10 min, more preferably of 0.2 to 1.2 g/10 min, and most preferably from 0.3 to 0.9 g/10 min, measured in accordance with ISO 1133 at 190° C. and a load of 5.0 kg.

The ethylene copolymer preferably has a density of below 965 kg/m$^3$, more preferably below 950 kg/m$^3$.

In the ethylene copolymer, preferably the weight ratio of fractions (I):(II) in the base resin is 35:65 or higher, i.e. is 35:65 or an even higher amount of fraction (I) is present, further preferred is 40:60 or higher, even more preferred is 42:58 or higher. The weight ratio of fraction (I):(II) may also preferably range between (43-51):(57-49).

Furthermore, preferably the weight ratio of fractions (I):(II) in the ethylene copolymer is 60 to 40 or lower, more preferably is 50:50 or lower.

The ethylene copolymer preferably comprises at least 0.25 mol %, more preferably at least 0.55 mol %, more preferably at least 0.75 mol %, and still more preferably at least 0.95 mol % of at least one alpha-olefin comonomer having at least 3 carbon atoms.

Fraction (II) of the ethylene copolymer preferably comprises at least 0.5 mol %, more preferably at least 1.1 mol %, and still more preferably at least 1.5 mol % of at least one alpha-olefin comonomer having at least 3 carbon atoms.

The alpha-olefin comonomer of fraction (II) and the base resin is preferably having from 3 to 8 carbon atoms, more preferably from 6 to 8 carbon atoms, and most preferably is selected from 1-hexene, 4-methyl-1-pentene and 1-octene.

Further, the ethylene copolymer preferably has a density of 930 kg/m$^3$ or higher.

The MFR (ISO 1133, 190° C., 5 kg) of the ethylene copolymer preferably is 5 g/10 min or below, more preferably 1 g/10 min or below.

Fraction (I) of the polyethylene composition preferably is having a density of 950 kg/m$^3$ or higher, more preferably of 960 kg/m$^3$ or higher, and most preferably of 968 kg/m$^3$ or higher.

Fraction (I) of the polyethylene composition preferably is an ethylene homopolymer.

The MFR (ISO 1133, 190° C., 2.16 kg) of fraction (I) preferably is at least 10 g/10 min, more preferably is at least 100 g/10 min, more preferably is at least 200 g/10 min.

The above polyolefin composition according to the present invention may be prepared by a process which comprises the steps of (a) adding to an olefin homo- or copolymer (A) in its molten state, an activated carbon (B) as a taste and odour reducing agent, and (b) thoroughly compounding the components (A) and (B) to obtain a homogeneous polyolefin composition.

According to the present invention, when the taste and odour reducing agent is added to the polyolefin raw material in its molten state, it may be compounded to pellets of finished material. The activated carbon may be added either as it is or in the form of a so-called master batch, i.e. mixed with a polymer. The process may preferably be conducted in an extruder or another compounding device. If an extruder is used, the components are mixed and the activated carbon is uniformly distributed by dispersion in the molten polymer material.

In the final polyolefin composition the activated carbon will effectively catch and eliminate undesired odour- and/or taste-causing substances and therefore, the polyolefin composition and pipe material made therefrom will provide effective and improved taste- and/or odour reduction which facilitates the transport of any desired material through such pipe material, especially if water pipes are envisaged.

The present invention will be illustrated by the following non-limiting examples given below.

METHODS AND EXAMPLES

1. Odour and/or Taste Testing (Organoleptic Testing)

For the purpose of determining the emission of taste-causing substances from different plastic materials, a great number of materials have been tested while using a taste panel. The testing materials have been produced by compounding an HD polyethylene and different activated carbons. The material was pelletized in conjunction with the extrusion and put in clean glass bottles in order to conserve the taste and odour level.

Sample Preparation

A sample of 32 g pellets was taken for each test. The pellet sample is placed in a Büchner funnel and rinsed with reference water for one minute. The granules are transferred to an Erlenmeyer flask with ground joint containing a magnetic bar and the flask is filled with reference water and closed with a glass plug. The ratio between granules and water volume should be 32 g/1000 ml. It is important that no air bubbles appear between the glass plug and the granules. The flask is placed for 4 hours in a magnetic agitator bath with a temperature of 30° C.±1° C. (polypropylene material: 70° C.±1° C.) and with a good stirring speed.

After the extraction, the test water is poured into a glass bottle with ground joint and closed with a glass plug. The bottle is left over night. The next day the organoleptic test can be performed. The reference water is prepared as described above but without granules.

The difference in temperature between the test water and the reference water may not exceed 0.5° C.

The organoleptic panel shall consist of 5 or more participants for the taste test and 3 or more participants for the odour test. The participants shall be trained and familiar with taste/odour judgement of water samples. The test water was diluted according to table below:

| Sample | Test water (ml) | Dilution water (ml) | Taste/odour level |
|--------|-----------------|---------------------|-------------------|
| 1 | 400 | 0 | 1 |
| 2 | 260 | 140 | 1.5 |
| 3 | 200 | 200 | 2 |
| 4 | 100 | 300 | 4 |

Calculation of taste/odour level is performed according to formula:

$(a+b)/a$=taste/odour level, wherein:

a=volume (ml) of the inspected water in the mixture, where the taste and odour can be detected.

b=volume of dilution water, which is used in the mixture (total) volume a+b=400 ml. The dilution water shall have the same quality as the reference water.

The test water samples, 1-4, are transferred to plastic cups and placed in front of each participant. Place the cups in a system, where the degree of test water in the samples increases gradually, i.e. sample no 4 as the first sample and sample no 1 as the last sample.

Fill 4 cups with reference water, which are placed in pairs with diluted samples. Next to these samples, place a cup with known reference water (0-sample). The task for the participant in the panel is to compare to known reference water with the coded samples in each pair of cups. The participant will decide if the two samples in each pair are equal or if any of the samples have an annoying taste/odour.

In a protocol, the participant indicates with a cross if any of the samples pairs have an annoying taste/odour. The procedure is to start with sample pair no. 4 and conclude with sample pair no. 1, i.e. any possible taste/odour annoying components are gradually increasing. A protocol for taste/odour test is enclosed.

The result from the taste/odour test is recorded in a protocol and evaluated. Taste/odour in test water exists, if >50% of the participants in a panel indicate taste/odour in a test water.

The following taste/odour levels exist; <1, 1-1.5, 1.5-2, 2-4, >4

Example of different taste/odour points and corresponding taste/odour levels with 5/3 participants in the organoleptic panel,

| taste/odour points | taste/odour level |
|--------------------|-------------------|
| 2110 | <1 |
| 3210 | 1-1.5 |
| 3321 | 1.5-2 |
| 5430 | 2-4 |
| 5533 | >4 |

The border line for a material to be approved concerning taste/odour is 1.5-2.

2. Compositions

The compositions and the taste and odour results of some evaluated materials are summarized in Table 1.

Below is a description of the components used:

Base resin: bimodal polyethylene, $MFR_5$: 0.25 g/10 min, (ISO 1133, 190° C.), $MFR_{21}$: 9.0 g/10 min (ISO 1133, 190° C.), density: 948 kg/m³, comonomer: 1-butene.

AK0725: coconut based granulated activated carbon (available from Univar A/S, Denmark), moisture (as packed): <5.0 wt.-% (ASTM D2867), ash content: <5.0 wt.-% (ASTM D2866), BET surface area: >1150 m²/g (DIN 66132), iodine number: >1050 mg/g (DIN 53582), bulk density: 460+30 kg/m³ (ASTM D2866).

AK0175: powdered activated carbon (available from Univar A/S, Denmark), moisture (as packed): <8.0 wt.-% (ASTM D2867), ash content: ca. 10 wt.-% (ASTM D2866), BET surface area: >550 m²/g (DIN 66132), iodine number: >550 mg/g (DIN 53582), bulk density: 450-600 kg/m³ (ASTM D2854).

AK0705: granulated activated carbon (available from Univar A/S, Denmark), moisture (as packed): <5.0 wt.-% (ASTM D2867), ash content: <10.0 wt.-% (ASTM D2866), BET surface area: >900 m²/g (DIN 66132), iodine number: 950 mg/g (AWWA B604), bulk density: 400+50 kg/m³ (ASTM D2854).

AK0715: granulated activated carbon (available from Univar A/S, Denmark), moisture (as packed): <2.0 wt.-%, BET surface area: 1000+50 m²/g (DIN 66132), iodine number: >950 mg/g (DIN 53582), bulk density: 450+20 kg/m³ (ASTM D2854), pore volume: 0.8 ml/g, ash content <8%.

Abscents 2500: Odour neutralizer available from UOP (USA). Composition: Sodium alumino silicate (zeolite), CAS-no. 1318-02-1

Irganox B225: antioxidant blend (available from Ciba Specialty Chemicals, Switzerland)

Carbon black masterbatch. Carrier: polyethylene. Carbon black content: 40 wt.-%. $MFR_{21}$: 45 g/10 min (ISO 1133, 190° C.).

Ca-stearate: acid scavenger and lubricator

3. Compounding

The compositions in Table 1 were compounded on a Buss co kneader, type MD46, 15D. Temperature settings on the mixer part were 190° C. on the barrel and 130° C. on the screw. On the extruder the temperature settings were 195° C. on the barrel and 180° C. on the screw and 195° C. on the die. The maximum product temperature reached was approximately 218° C. The activated carbon was dry-mixed with the additives, and added together with the base resin and, in some formulations, with the carbon black master batch (CBMB), by a gravimetric feeder into the first port of the mixer. The Carbon Black content in the final compound was 2%. After pelletizing the products were dried and packed in polyethylene bags.

4. Results

Table 1 shows that by adding a conventional zeolitic taste and odour reducing additive such as Abscents 2500, the taste and odour levels are reduced, as expected.

However, the cost penalty is very high, which limits its use considerably. In contrast, the addition of activated carbon, according to the present invention, yields a similar or even better taste and odour reducing effect, and is superior in cost-effectiveness.

5. Additional Compositions

TABLE 1

| Formulation [wt-%] | Ref. 1 | Activated carbon | | | | Abscents 2500 | |
|---|---|---|---|---|---|---|---|
| | | AC1 | AC2 | AC3 | AC4 | A1 | A2 |
| Base resin | 99.55 | 98.95 | 98.95 | 93.95 | 93.95 | 98.95 | 93.93 |
| Carbon black MB | | | | 5 | 5 | | 5 |
| Irganox B225 | 0.3 | 0.3 | 0.3 | 0.3 | 0.3 | 0.3 | 0.3 |
| Ca-stearate | 0.15 | 0.15 | 0.15 | 0.15 | 0.15 | 0.15 | 0.15 |
| AK0725 | | 0.6 | | 0.6 | | | |
| AK0175 | | | 0.2 | | 0.2 | | |
| AK0705 | | | 0.2 | | 0.2 | | |
| AK0715 | | | 0.2 | | 0.2 | | |
| Abscents 2500 | | | | | | 0.6 | 0.6 |
| Taste observations | 5543 | 4221 | 2110 | 4310 | 5221 | 5522 | 5431 |
| Taste rating | >4 | 1-1.5 | <1 | 1.5-2 | 1-1.5 | 1.5-2 | 2-4 |
| Odour observations | 3322 | 2221 | 2110 | 2210 | 2220 | 3000 | 2110 |
| Odour rating | >4 | 2-4 | 1-1.5 | 1.5-2 | 2-4 | 1-1.5 | 1-1.5 |
| Relative additional cost | — | 1 | 1 | 1 | 1 | >4 | >4 |

Pulsorb BL: activated carbon (available from Chemviron Carbon, Belgium), moisture (as packed): <5 wt.-% (ASTM D2867), BET surface area: 1000 m²/g, iodine number: >1000 mg/g (ASTM D4607), loose packed density 300 kg/m³, pH: 8-10, acid soluble ash: 1.3 wt.-%.

SX 1 G: activated carbon (available from Norit, The Netherlands), moisture (as packed): <10 wt.-%, BET surface area: 1000 m²/g, iodine number: 900 mg/g, apparent density (tamped): 400 kg/m³), methylene blue adsorption: 18 g/100 g, pH: neutral, ash content: 5 wt.-%.

6. Compounding

The compositions in Table 2 were produced by compounding the high density polyethylene containing normal additives that are required for stabilization/processing and also serving as reference material, and the different activated carbon grades on a Prism lab compounding line at 200° C. with an output of 2.5 kg/h. The material was pelletized in conjunction with

TABLE 2

| | | | Activated carbon | | |
|---|---|---|---|---|---|
| Grade name | Manufacturer | Ref. 2 | AC6 | AC7 | AC8 |
| Polymer | | 100 | 99.5 | 99.5 | 99.5 |
| Organosorb 200-1 | Desotec | | 0.5 | | |
| Pulsorb BL | Chemviron Carbon | | | 0.5 | |
| SX 1 G | Norit | | | | 0.5 |
| Taste observations | | 4442 | 5431 | 5420 | 4321 |
| Taste level | | 2-4 | 2-4 | 1.5-2 | 1.5-2 |
| Odour observations | | 3331 | 2210 | 3310 | 3210 |
| Odour level | | 2-4 | 1.5-2 | 1.5-2 | 1.5-2 |

In Table 2, the compositions and the taste and odour results of some additional evaluated materials are summarized.

Below is a description of the components used:

Polymer: bimodal polyethylene, $MFR_5$: 0.25 g/10 min, (ISO 1133, 190° C.), $MFR_{21}$: 9.0 g/10 min (ISO 1133, 190° C.), density: 959 kg/m³, comonomer: 1-butene, carbon black content 2.3 wt %.

Organosorb 200-1: activated carbon (available from Desotec, Belgium), moisture (as packed): <5 wt.-%, BET surface area: >980 m²/g, iodine number: >1000 mg/g, bulk density: 500 g/l, methylene bleu number: >130 mg/g, pH: 8, ash content 18.5 wt.-%.

the extrusion and directly put in clean glass bottles in order to preserve the taste and odour level.

7. Results

Table 2 shows that AC7 and AC8 compositions have reduced taste and odour levels compared to the reference material. AC6 on the other hand has just a reduced odour level compared to the reference. A characteristic feature of the activated carbon used for AC6 (Organosorb 200-1) is the ash content which is a high as 18.5 wt.-%. This is considerably higher than for SX 1G and Pulsorb BL. This illustrates the importance of having low ash content in order to obtain a significant taste and odour reducing effect. This is also supported by the results presented in Table 1, where all activated carbons used have an ash content below 10 wt.-%.

The invention claimed is:

1. A polyolefin composition comprising:
   (a) a multimodal polyethylene homo- or copolymer (A) having an MFR of 1 g/10 min or lower, measured in accordance with ISO 1133 at 190° C. and a load of 5.0 kg, a density of below 950 kg/m$^3$, and
   (b) a taste and/or odor reducing agent which consists of activated carbon (B) having an ash content of not more than 12.0 wt. % according to ASTM D2866 and a bulk density of 350 to 500 kg/m$^3$ and wherein activated carbon (B) is present in an amount of from 0.05 to 4 wt %, based on the weight of the total composition.

2. The polyolefin composition according to claim 1, wherein the activated carbon (B) is selected from the group consisting of crushed activated carbon, granulated activated carbon, fibrous activated carbon and powdered activated carbon.

3. The polyolefin composition according to claim 1, wherein the activated carbon (B) is selected from the group consisting of an activated carbon based on coconut, an activated carbon based on coal and an activated carbon based on bitumen.

4. The polyolefin composition according to claim 3, wherein the activated carbon (B) is selected from the group consisting of an activated carbon based on coconut or an activated carbon based on bitumen.

5. The polyolefin composition according to claim 1, wherein the activated carbon has a BET specific surface area of from 500 to 1500 m$^2$/g.

6. The polyolefin composition according claim 1, wherein the activated carbon has an iodine value 500 to 1400 mg/g, determined according to DIN 66132.

7. The polyolefin composition according to claim 1, wherein the activated carbon has a graphite content of 97% by weight or more.

8. The polyolefin composition according to claim 1, wherein the polyethylene polymer is bimodal.

9. A pipe material comprising the polyolefin composition according to claim 1 having reduced taste and/or odor development.

* * * * *